United States Patent
Heil et al.

(10) Patent No.: US 9,262,160 B2
(45) Date of Patent: *Feb. 16, 2016

(54) LOAD LATENCY SPECULATION IN AN OUT-OF-ORDER COMPUTER PROCESSOR

(71) Applicant: INTERNATIONAL BUSINESS MACHINES CORPORATION, Armonk, NY (US)

(72) Inventors: Timothy H. Heil, Sammamish, WA (US); Andrew D. Hilton, Durham, NC (US); Adam J. Muff, Issaquah, WA (US)

(73) Assignee: International Business Machines Corporation, Armonk, NY (US)

( * ) Notice: Subject to any disclaimer, the term of this patent is extended or adjusted under 35 U.S.C. 154(b) by 357 days.

This patent is subject to a terminal disclaimer.

(21) Appl. No.: 13/785,311

(22) Filed: Mar. 5, 2013

(65) Prior Publication Data

US 2014/0223144 A1    Aug. 7, 2014

Related U.S. Application Data

(63) Continuation of application No. 13/760,843, filed on Feb. 6, 2013.

(51) Int. Cl.
*G06F 9/30* (2006.01)
*G06F 9/38* (2006.01)

(52) U.S. Cl.
CPC .......... *G06F 9/30043* (2013.01); *G06F 9/3836* (2013.01); *G06F 9/3838* (2013.01); *G06F 9/3842* (2013.01); *G06F 9/3859* (2013.01)

(58) Field of Classification Search
CPC ........................... G06F 9/30043; G06F 9/3836
See application file for complete search history.

(56) References Cited

U.S. PATENT DOCUMENTS

| | | | | |
|---|---|---|---|---|
| 5,958,041 | A * | 9/1999 | Petolino et al. | 712/214 |
| 6,304,955 | B1 * | 10/2001 | Arora | 712/217 |
| 6,981,129 | B1 | 12/2005 | Boggs et al. | |
| 7,055,021 | B2 | 5/2006 | Kadambi | |

(Continued)

OTHER PUBLICATIONS

Ernst, et al.; "Cyclone: A Broadcast-Free Dynamic Instruction Scheduler With Selective Replay", Proceedings of the 30th Annual International Symposium on Computer Architecture ISCA-2003; Jun. 2003, pp. 253-262, IEEE.org (online), Digital Object Identifier: 10.1109/ISCA.2003.1207005, URL: http://ieeexplore.ieee.org/xpl/login.jsp?tp=&arnumber=1207005&url=http%3A%2F%2Fieeexplore.ieee.org%2Fxpls%2Fabs_all.jsp%3Farnumber%3D1207005.

(Continued)

*Primary Examiner* — Andrew Caldwell
*Assistant Examiner* — Michael Choy
(74) *Attorney, Agent, or Firm* — Edward J. Lenart; James R. Nock; Kennedy Lenart Spraggins LLP (57) ABSTRACT

Load latency speculation in an out-of-order computer processor, including: issuing a load instruction for execution, wherein the load instruction has a predetermined expected execution latency; issuing a dependent instruction wakeup signal on an instruction wakeup bus, wherein the dependent instruction wakeup signal indicates that the load instruction will be completed upon the expiration of the expected execution latency; determining, upon the expiration of the expected execution latency, whether the load instruction has completed; and responsive to determining that the load instruction has not completed upon the expiration of the expected execution latency, issuing a negative dependent instruction wakeup signal on the instruction wakeup bus, wherein the negative dependent instruction wakeup signal indicates that the load instruction has not completed upon the expiration of the expected execution latency.

6 Claims, 5 Drawing Sheets

(56) References Cited

U.S. PATENT DOCUMENTS

| | | | |
|---|---|---|---|
| 7,958,336 B2* | 6/2011 | Lahav et al. | 712/216 |
| 2003/0191925 A1 | 10/2003 | Ernst et al. | |
| 2008/0244224 A1* | 10/2008 | Sassone et al. | 712/23 |
| 2010/0077181 A1* | 3/2010 | Abernathy et al. | 712/214 |

OTHER PUBLICATIONS

Kim, et al., "Understanding Scheduling Replay Schemes", Software, IEE Proceedings, 10$^{th}$ International Symposium on High-Performance Architecture (HPCA 10), Feb. 2004, pp. 198-209, IEE.org (online), DOI: 10.1109/HPCA.2004.10011, URL: http://ieeexplore.ieee.org/stamp/stamp.jsp?tp=&arnumber=1410077&isnumber=30563.

Memik et al., "Precise Instruction Scheduling", The Journal of Instruction-Level Parallelism, jilp.org (online), vol. 7, Apr. 2005, 21 pp., URL: http://www.jilp.org/vol7/index.html.

* cited by examiner

LOAD LATENCY SPECULATION IN AN OUT-OF-ORDER COMPUTER PROCESSOR

CROSS-REFERENCE TO RELATED APPLICATION

This application is a continuation application of and claims priority from U.S. patent application Ser. No. 13/760,843, filed on Feb. 6, 2013.

BACKGROUND OF THE INVENTION

1. Field of the Invention

The field of the invention is data processing, or, more specifically, methods, apparatus, and products for load latency speculation in an out-of-order computer processor.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Modern computing systems can execute load instructions in which the content of memory is read into a processor register. Load instructions may experience a variety of problems which cause the instruction to require a longer execution latency period than the best case. Such problems can include missing the data cache, missing in the address translation mechanism, and so on. This variable latency complicates scheduling of dependent operations, as the dependent operations must issue before the load's latency is known to take advantage of the best case latency.

SUMMARY OF THE INVENTION

Load latency speculation in an out-of-order computer processor, including: issuing a load instruction for execution, wherein the load instruction has a predetermined expected execution latency; issuing a dependent instruction wakeup signal on an instruction wakeup bus, wherein the dependent instruction wakeup signal indicates that the load instruction will be completed upon the expiration of the expected execution latency; determining, upon the expiration of the expected execution latency, whether the load instruction has completed; and responsive to determining that the load instruction has not completed upon the expiration of the expected execution latency, issuing a negative dependent instruction wakeup signal on the instruction wakeup bus, wherein the negative dependent instruction wakeup signal indicates that the load instruction has not completed upon the expiration of the expected execution latency.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
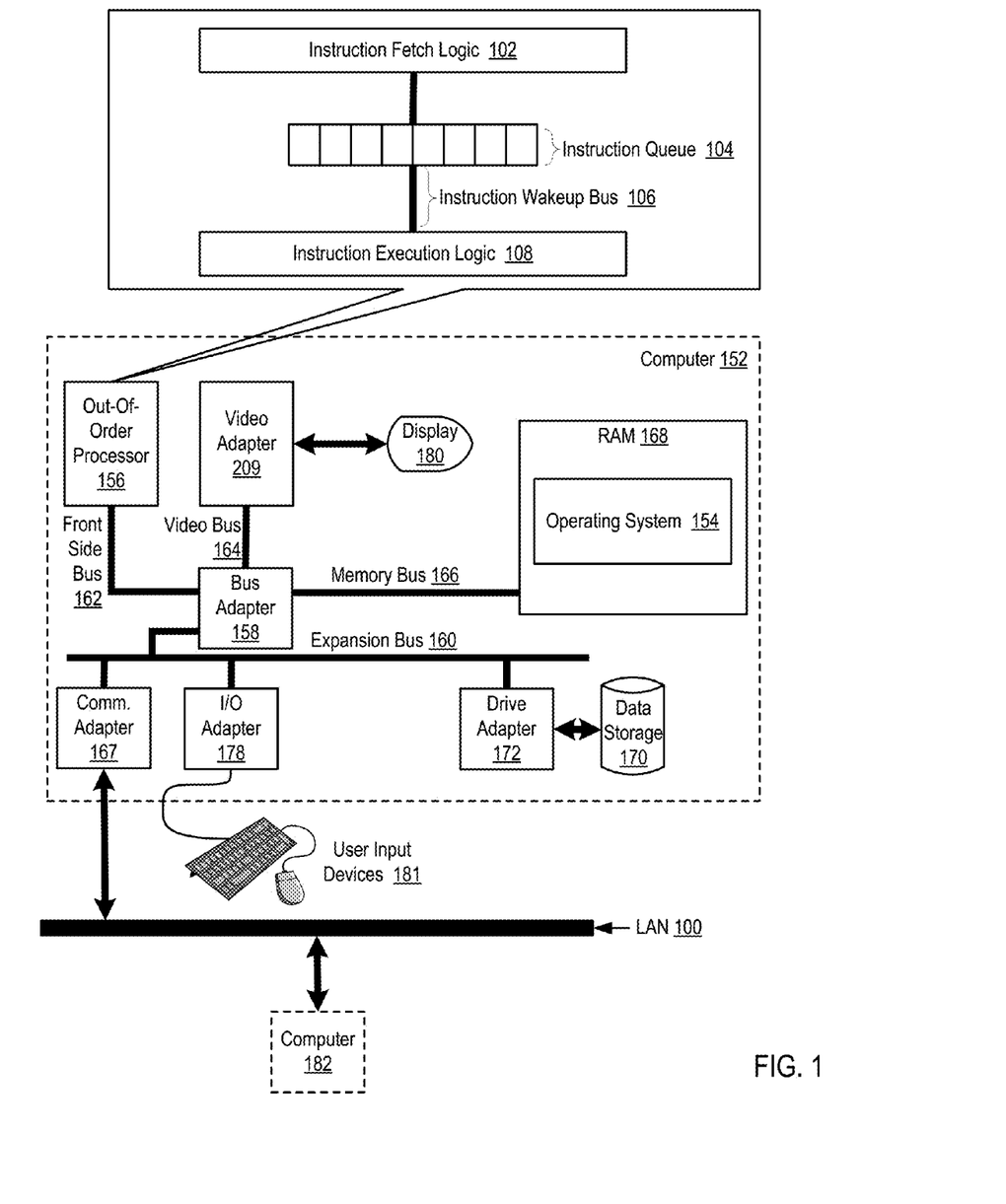
FIG. 1 sets forth a block diagram of automated computing machinery comprising an example computer useful in load latency speculation in an out-of-order computer processor according to embodiments of the present invention.

Example methods, apparatus, and products for load latency speculation in an out-of-order computer processor in accordance with the present invention are described with reference to the accompanying drawings, beginning with FIG. 1. FIG. 1 sets forth a block diagram of automated computing machinery comprising an example computer (152) useful in load latency speculation in an out-of-order computer processor (156) according to embodiments of the present invention. The computer (152) of FIG. 1 includes at least one computer out-of-order processor (156) as well as random access memory (168) ('RAM') which is connected through a high speed memory bus (166) and bus adapter (158) to out-of-order processor (156) and to other components of the computer (152). In the example of FIG. 1, the out-of-order processor (156) is a microprocessor that executes instructions in an order governed by the availability of input data for each instruction, rather than executing instructions based on the order of the instructions in a computer program. In such a way, the out-of-order processor (156) can make more efficient use of available processing cycles as the out-of-order processor (156) can avoid being idle while data is retrieved for the next instruction in a program.

The out-of-order processor (156) of FIG. 1 includes instruction fetch logic (102). The instruction fetch logic (102) of FIG. 1 may be embodied as one or more digital circuits configured to retrieve an instruction from program memory. The location in program memory from which the instruction is retrieved may be determined by a program counter that identifies the current position in the program. The instruction fetch logic (102) of FIG. 1 may be further configured decode the fetched instruction and place the decoded instruction in the instruction queue (104) for execution. In the example of FIG. 1, the instruction queue (104) represents a data structure for storing instructions that are to be executed by the out-of-order-processor (156). Entries in the instruction queue can also include information identifying the various input parameters that are need to execute the instruction, as well as information such as status bits indicating whether the various input parameters that are need to execute the instruction are available.

In the example of FIG. 1, instructions are retrieved from the instruction queue (104) and subsequently executed by the instruction execution logic (108). In the example of FIG. 1, the instruction execution logic (108) may be embodied as one or more digital circuits, such as an arithmetic logic unit ('ALU'), for executing instructions. The instruction execution logic (108) of FIG. 1 may be coupled to the instruction queue (104) in many ways, including by an instruction wakeup bus (106). In the example of FIG. 1, the instruction wakeup bus (106) may be embodied as a data communications path through which the instruction execution logic (108) can access the instruction queue (104).

The example computer of FIG. 1 can carry out load latency speculation in the out-of-order processor (156) by issuing a load instruction for execution. The load instruction represents an instruction to read the content of a location in memory into a processor register. In the example of FIG. 1, the load instruction can have a predetermined expected execution latency. The predetermined expected execution latency represents the expected number of processing cycles of the out-of-order processor (156) that are needed in order for the load instruction to complete.

The expected number of processing cycles of the out-of-order processor (156) that are needed in order for the load instruction to complete can vary, for example, based on the availability of the data that is to be read from a location in memory into a processor register. Consider an example in which the load instruction receives two operands, wherein the first operand identifies a location in memory that contains a value that is to be loaded into a register on the out-of-order processor (156), and the second operand identifies the register on the out-of-order processor (156) that the data is to be written into. In such an example, the expected number of processing cycles that are needed in order for the load instruction to complete can depend on the amount of processing cycles that occur retrieving the data from the location in memory identified by the first operand. If the data can be retrieved from a level 1 cache, the number of processing cycles may be relatively small compared to the number of processing cycles that occur if the data is not located in a cache and must be retrieved from RAM (168). The predetermined expected execution latency for the load instruction may therefore be determined based on certain assumptions. For example, the predetermined expected execution latency for the load instruction may be determined by assuming that the load instruction can retrieve the data that it is to read into the processor register in a number of processing cycles that is equivalent to a level 1 cache hit.

The example computer of FIG. 1 can further carry out load latency speculation in the out-of-order processor (156) by issuing a dependent instruction wakeup signal on an instruction wakeup bus (106). A dependent instruction is an instruction that makes use of the data read into the processor register by the load instruction. Consider an example in which the load instruction reads some data into a processor register, named 'register 1,' on the out-of-order processor (156). In such an example, a dependent instruction can include any instruction that uses the value in 'register 1' as an input parameter. Dependent instructions can also include instructions that make use of a value generated by an instruction that uses the value in 'register 1' as an input parameter. That is, dependent instructions can be directly dependent or indirectly dependent on the load instruction. An instruction can be directly dependent on the load instruction when the instruction makes use of the data loaded into the processor register by the load instruction. An instruction can be indirectly dependent on the load instruction when the instruction makes use of data produced by another dependent instruction. Readers will appreciate that there can be an unlimited number of dependent instructions as each instruction in a sequence of instructions may be dependent upon the preceding instruction. For example, if instruction A is directly dependent on the load instruction, instruction B is dependent upon a value produced by instruction A, instruction C is dependent upon a value produced by instruction B, and instruction D is dependent upon a value produced by instruction C, each of these instructions is a dependent instruction as their dependency can be traced back to the load instruction.

A dependent instruction wakeup signal is a signal indicating that data to be utilized by a dependent instruction will be available within a predetermined number of processing cycles such that the dependent instruction can be placed in the instruction pipeline for subsequent fetching, decoding, and execution. Issuing a dependent instruction wakeup signal on an instruction wakeup bus (106) can therefore have the effect of beginning the process of executing a dependent instruction. In particular, the dependent instruction wakeup signal can indicate that the load instruction will be completed upon the expiration of the expected execution latency. As such, the dependent instruction wakeup signal can include information identifying the expected execution latency for the load instruction such that the dependent instruction can enter the execution stage once the load instruction has completed.

The example computer of FIG. 1 can further carry out load latency speculation in the out-of-order processor (156) by determining, upon the expiration of the expected execution latency, whether the load instruction has completed. Determining whether the load instruction has completed may be carried out, for example, by determining whether an instruction writeback has occurred indicating that the load instruction has completed. In such an example, determining whether the load instruction has completed can occur upon the expiration of the expected execution latency such that it can be determined if the load instruction completed execution within the expected number of clock cycles.

Consider the example described above in which the predetermined expected execution latency for the load instruction is determined by assuming that the load instruction can retrieve the data that it is to read into a processor register in a number of processing cycles that is equivalent to a level 1 cache hit. In such an example, if the load instruction has completed upon the expiration of the expected execution latency, a level 1 cache hit did occur when the load instruction read data from memory into the processor register. If the load instruction has not completed upon the expiration of the expected execution latency, however, a level 1 cache miss may have occurred when the load instruction attempted to read data from a location in memory into the processor register. In an example in which the load instruction has not completed upon the expiration of the expected execution latency, the dependent instructions for which a dependent instruction wakeup signal was issued will not be able to execute upon the expiration of the expected execution latency as the data that the dependent instructions need to execute has not been loaded into the processor register by the load instruction.

The example computer of FIG. 1 can further carry out load latency speculation in the out-of-order processor (156) by issuing a negative dependent instruction wakeup signal on the instruction wakeup bus. The negative dependent instruction wakeup signal is issued in response to determining that the load instruction has not completed upon the expiration of the expected execution latency. The negative dependent instruction wakeup signal is a signal indicating that data to be utilized by a dependent instruction will not be available in the number of execution cycles previously expected. Issuing a negative dependent instruction wakeup signal can therefore have the effect of squashing the execution of any instructions that are dependent upon the completion of the load instruction. The negative dependent instruction wakeup signal can indicate that the load instruction has not completed upon the expiration of the expected execution latency.

Stored in RAM (168) of the computer (152) is an operating system (154). Operating systems useful load latency speculation in an out-of-order computer processor (156) according to embodiments of the present invention include UNIX™, Linux™, Microsoft XP™, AIX™, IBM's i5/OS™, and others as will occur to those of skill in the art. The operating system (154) is shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to out-of-order processor (156) and other components of the computer (152). Disk drive adapter (172) connects non-volatile data storage to the computer (152) in the form of disk drive (170). Disk drive adapters useful in computers for load latency speculation in an out-of-order computer processor (156) according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to out-of-order processor (156) through a high speed video bus (164), bus adapter (158), and the front side bus (162), which is also a high speed bus.

The example computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for load latency speculation in an out-of-order computer processor (156) according to embodiments of the present invention include modems for wired dial-up communications, Ethernet (IEEE 802.3) adapters for wired data communications network communications, and 802.11 adapters for wireless data communications network communications.

Figure 2:
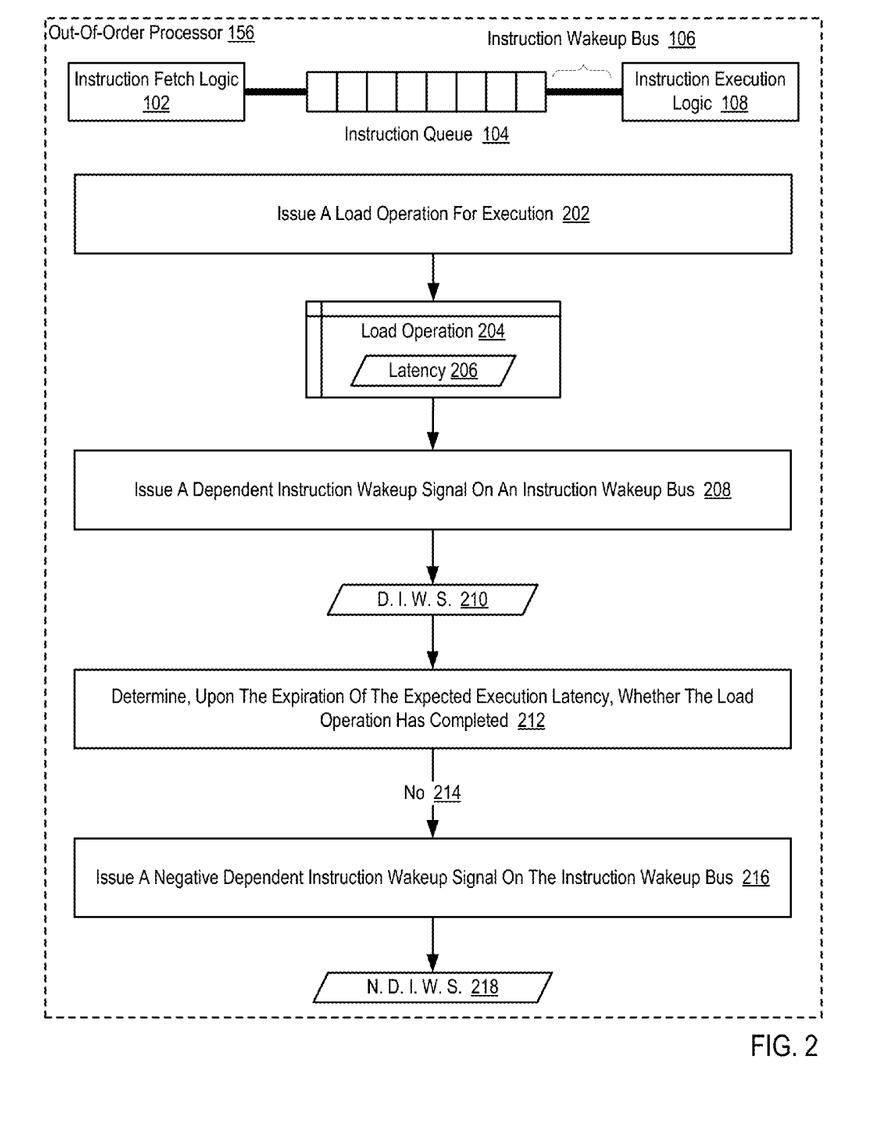
FIG. 2 sets forth a flow chart illustrating an example method for load latency speculation in an out-of-order computer processor according to embodiments of the present invention.

For further explanation, FIG. 2 sets forth a flow chart illustrating an example method for load latency speculation in an out-of-order computer processor according to embodiments of the present invention. The example method of FIG. 2 is carried out in an out-of-order processor (156) as described above with reference to FIG. 1. In the example method of FIG. 2, the out-of-order processor (156) is a microprocessor that executes instructions in an order governed by the availability of input data for each instruction, rather than executing instructions based on the order of the instructions in a computer program. In such a way, the out-of-order processor (156) can make more efficient use of available processing cycles as the out-of-order processor (156) can avoid being idle while data is retrieved for the next instruction in a program.

The example method of FIG. 2 includes issuing (202) a load instruction (204) for execution. In the example method of FIG. 2, the load instruction (204) represents an instruction to read data from a location in memory into a processor register. In the example method of FIG. 2, the load instruction (204) has a predetermined expected execution latency (206). The predetermined expected execution latency (206) represents the expected number of processing cycles of the out-of-order processor (156) that are needed in order for the load instruction (204) to complete.

The expected number of processing cycles of the out-of-order processor (156) that are needed in order for the load instruction (204) to complete can vary, for example, based on the availability of the data that is to be read from memory into a processor register by the load instruction (204). Consider an example in which the load instruction (204) receives two operands, wherein the first operand identifies a location in memory that contains a value that is to be loaded into a register on the out-of-order processor (156), and the second operand identifies the register on the out-of-order processor (156) that the data is to be written into. In such an example, the expected number of processing cycles that are needed in order for the load instruction (204) to complete can depend on the amount of processing cycles that occur retrieving the data from the location in memory identified by the first operand. If the data can be retrieved from a level 1 cache, the number of processing cycles may be relatively small compared to the number of processing cycles that occur if the data is not located in a cache and must be retrieved from RAM. The predetermined expected execution latency (206) for the load instruction (204) may therefore be determined based on certain assumptions. For example, the predetermined expected execution latency (206) for the load instruction (204) may be determined by assuming that the load instruction (204) can retrieve the data that it is to read into the processor register in a number of processing cycles that is equivalent to a level 1 cache hit.

The example method of FIG. 2 also includes issuing (208) a dependent instruction wakeup signal (210) on an instruction wakeup bus (106). In the example method of FIG. 2, a dependent instruction is an instruction that makes use of the data loaded into the processor register by the load instruction (204). Consider an example in which the load instruction reads some data into a register, named 'register 1,' on the out-of-order processor (156). In such an example, a dependent instruction can include any instruction that uses the value in 'register 1' as an input parameter. Dependent instructions can also include instructions that make use of a value generated by an instruction that uses the value in 'register 1' as an input parameter. That is, dependent instructions can be directly dependent or indirectly dependent on the load instruction (204). An instruction can be directly dependent on the load instruction (204) when the instruction makes use of the data loaded into the processor register by the load instruction (204). An instruction can be indirectly dependent on the load instruction (204) when the instruction makes use of data produced by another dependent instruction. Readers will appreciate that there can be an unlimited number of dependent instructions as each instruction in a sequence of instructions may be dependent upon the preceding instruction. For example, if instruction A is directly dependent on the load instruction (204), instruction B is dependent upon a value produced by instruction A, instruction C is dependent upon a value produced by instruction B, and instruction D is dependent upon a value produced by instruction C, each of these instructions is a dependent instruction as their dependency can be traced back to the load instruction (204).

In the example method of FIG. 2, a dependent instruction wakeup signal (210) is a signal indicating that data to be utilized by a dependent instruction will be available within a predetermined number of processing cycles such that the dependent instruction can be placed in the instruction pipeline for subsequent fetching, decoding, and execution. Issuing (208) a dependent instruction wakeup signal (210) on an instruction wakeup bus (106) can therefore have the effect of beginning the process of executing a dependent instruction. In particular, the dependent instruction wakeup signal (210) of FIG. 2 can indicate that the load instruction (204) will be completed upon the expiration of the expected execution latency (206). As such, the dependent instruction wakeup signal (210) of FIG. 2 can include information identifying the expected execution latency (206) for the load instruction (204) such that the dependent instruction can enter the execution stage once the load instruction (204) has completed.

The example method of FIG. 2 also includes determining (212), upon the expiration of the expected execution latency (206), whether the load instruction (204) has completed. In the example method of FIG. 2, determining (212) whether the load instruction (204) has completed may be carried out, for example, by determining whether an instruction writeback has occurred indicating that the load instruction (204) has completed. In such an example, determining (212) whether the load instruction (204) has completed can occur upon the expiration of the expected execution latency (206) such that it can be determined if the load instruction (204) completed execution within the expected number of clock cycles.

Consider the example described above in which the predetermined expected execution latency (206) for the load instruction (204) is determined by assuming that the load instruction (204) can retrieve the data that it is to read into a processor register in a number of processing cycles that is equivalent to a level 1 cache hit. In such an example, if the load instruction (204) has completed upon the expiration of the expected execution latency (206), a level 1 cache hit did occur when the load instruction (204) read data from memory into the processor register. If the load instruction (204) has not completed upon the expiration of the expected execution latency (206), however, a level 1 cache miss may have occurred when the load instruction (204) attempted to read data from memory into the processor register. In an example in which the load instruction (204) has not completed upon the expiration of the expected execution latency (206), the dependent instructions for which a dependent instruction wakeup signal (210) was issued (208) will not be able to execute upon the expiration of the expected execution latency (206) as the data that the dependent instructions need to execute has not been written into memory by the load instruction (204).

The example method of FIG. 2 also includes issuing (216) a negative dependent instruction wakeup signal (218) on the instruction wakeup bus (106). In the example method of FIG. 2 the negative dependent instruction wakeup signal (218) is issued (216) in response to determining that the load instruction (204) has not (214) completed upon the expiration of the expected execution latency (206). In the example method of FIG. 2, the negative dependent instruction wakeup signal (218) is a signal indicating that data to be utilized by a dependent instruction will not be available in the number of execution cycles previously expected. Issuing a negative dependent instruction wakeup signal (218) can therefore have the effect of squashing the execution of any instructions that are dependent upon the completion of the load instruction (204). In the example method of FIG. 2, the negative dependent instruction wakeup signal (218) of FIG. 2 can indicate that the load instruction (204) has not completed upon the expiration of the expected execution latency (206).

Figure 3:
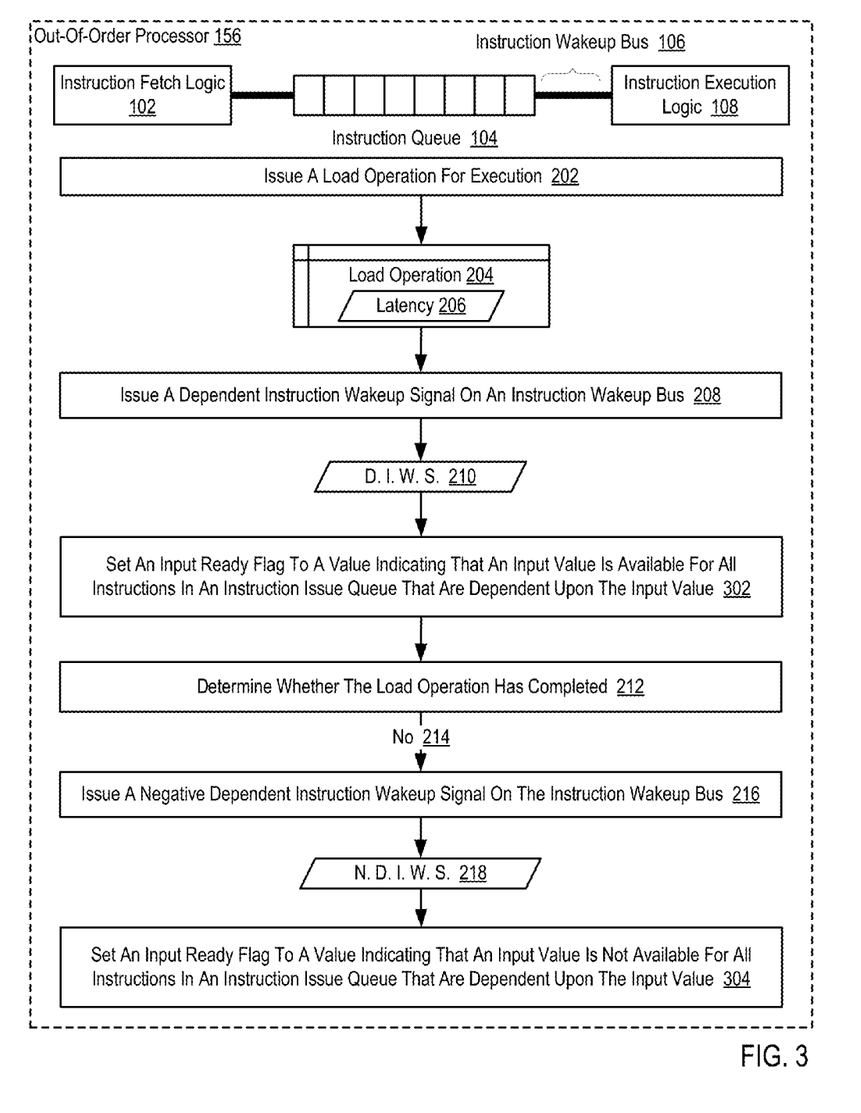
FIG. 3 sets forth a flow chart illustrating a further example method for load latency speculation in an out-of-order computer processor according to embodiments of the present invention.

For further explanation, FIG. 3 sets forth a flow chart illustrating a further example method for load latency speculation in an out-of-order computer processor (156) according to embodiments of the present invention. The example method of FIG. 3 is similar to the example method of FIG. 2 as it also includes issuing (202) a load instruction (204) for execution, issuing (208) a dependent instruction wakeup signal (210) on an instruction wakeup bus (106), determining (212) whether the load instruction (204) has completed, and issuing (216) a negative dependent instruction wakeup signal (218) on the instruction wakeup bus (106).

The example method of FIG. 3 also includes setting (302) an input ready flag to a value indicating that an input value is available for all instructions in an instruction queue (104) that are dependent upon the input value. In the example method of FIG. 3, each instruction may have one or more input ready flags associated with input values that are used as parameters by the instruction. In order for a particular instruction to be executed, each parameter that is used by the instruction must be available. For example, if a particular instruction uses the value loaded into a processor register by the load instruction (204) as an input parameter, the instruction cannot be executed until the load instruction (204) is completed. Each instruction may therefore be associated with one or more input ready flags whose value indicates whether a particular input used by an instruction is available and ready for use when executing the instruction. An input ready flag may be embodied, for example, as an integer value in an array, as a bit in a bit vector, and so on.

Consider an example in which a particular instruction needs three input parameters in order to execute. Assume that the input ready flag for each input parameter is embodied as a bit in a bit vector, such that a bit vector of '000' indicates that none of the input parameters are available, a bit vector of '100' indicates that the input parameter associate with the first bit in the bit vector is available, a bit vector of '111' indicates that all of the input parameters are available, and so on. In such an example, setting (302) an input ready flag to a value indicating that an input value is available for all instructions in an instruction queue (104) that are dependent upon the input value may be carried out by setting the appropriate value in the bit vector associated with each instruction.

In the example method of FIG. 3, setting (302) an input ready flag to a value indicating that an input value is available for all instructions in an instruction queue (104) that are dependent upon the input value occurs in response to the receipt of a dependent instruction wakeup signal (210). As described above, the dependent instruction wakeup signal (210) is a signal indicating that data to be utilized by a dependent instruction will be available within a predetermined number of processing cycles such that the dependent instruction can be placed in the instruction pipeline for subsequent fetching, decoding, and execution. The dependent instruction wakeup signal (210) of FIG. 3 indicates that the load instruction (204) will be completed upon the expiration of the expected execution latency (206). As such, an input ready flag that is associated with the load instruction (204) may be set (302) to a value indicating that the load instruction (204) has been completed and that the value loaded into the processor register by the load instruction (204) is available for dependent operations.

The example method of FIG. 3 also includes setting (304) an input ready flag to a value indicating that an input value is not available for all instructions in an instruction queue (104) that are dependent upon the input value. In the example method of FIG. 3, setting (304) an input ready flag to a value indicating that an input value is not available for all instructions in an instruction queue (104) that are dependent upon the input value occurs in response to the receipt of a negative dependent instruction wakeup signal (218). As described above, the negative dependent instruction wakeup signal (218) is a signal indicating that data to be utilized by a dependent instruction will not be available in the number of execution cycles previously expected. The negative dependent instruction wakeup signal (218) of FIG. 3 indicates that the load instruction (204) will not be completed upon the expiration of the expected execution latency (206). As such, an input ready flag that is associated with the load instruction (204) may be set (304) to a value indicating that the load instruction (204) has not been completed and that the value loaded into memory by the load instruction (204) is not available for dependent operations.

Figure 4:
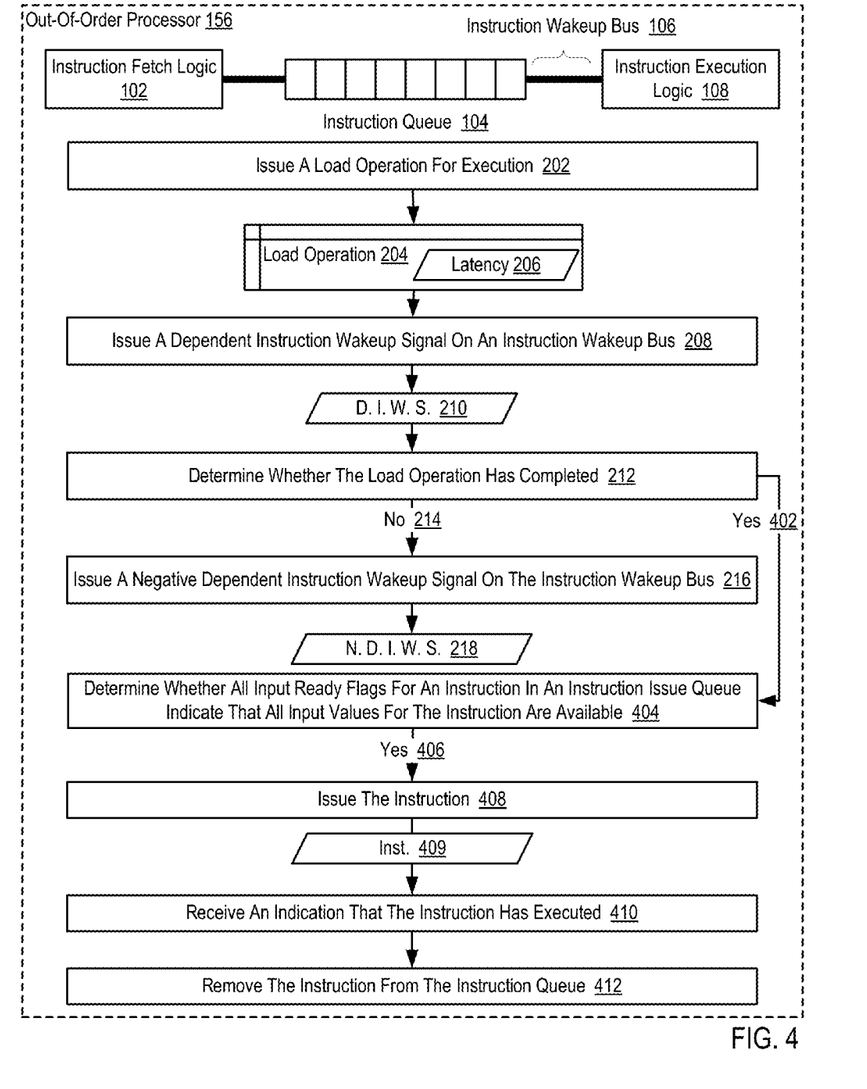
FIG. 4 sets forth a flow chart illustrating a further example method for load latency speculation in an out-of-order computer processor according to embodiments of the present invention.

For further explanation, FIG. 4 sets forth a flow chart illustrating a further example method for load latency speculation in an out-of-order computer processor according to embodiments of the present invention. The example method of FIG. 4 is similar to the example method of FIG. 2 as it also includes issuing (202) a load instruction (204) for execution, issuing (208) a dependent instruction wakeup signal (210) on an instruction wakeup bus (106), determining (212) whether the load instruction (204) has completed, and issuing (216) a negative dependent instruction wakeup signal (218) on the instruction wakeup bus (106).

The example method of FIG. 4 also includes determining (404) whether all input ready flags for an instruction (409) in an instruction queue (104) indicate that all input values for the instruction (409) are available. In the example method of FIG. 4, the out-of-order processor (156) may determine (404) whether all input ready flags for an instruction (409) in an instruction queue (104) indicate that all input values for the instruction (409) are available after determining that the load instruction (204) has (402), as the value loaded into memory by the load instruction (204) may represent the last input value that the instruction (409) is waiting for. In the example method of FIG. 4, determining (404) whether all input ready flags for an instruction (409) in an instruction queue (104) indicate that all input values for the instruction (409) are available may be carried out, for example, by inspecting the bit vector or other data structure that identifies the availability of each input value that the instruction (409) is dependent upon.

The example method of FIG. 4 also includes issuing (408) the instruction (409). In the example method of FIG. 4, issuing (408) the instruction (409) is carried out in response to determining that all input ready flags for the instruction (409) indicate that all input values for the instruction (409) are (406) available. In the example method of FIG. 4, issuing (408) the instruction (409) may be carried out, for example, by sending the instruction (409) to an arithmetic logic unit ('ALU') in the out-of-order processor (156) for execution.

The example method of FIG. 4 also includes receiving (410) an indication that the instruction (409) has executed. In the example method of FIG. 4, receiving (410) an indication that the instruction (409) has executed can be carried out, for example, by determining that a return value generated by the instruction has been written to a location in memory that is set aside for retaining the result of the instruction (409).

The example method of FIG. 4 also includes removing (412) the instruction (409) from the instruction queue (104). In the example method of FIG. 4, once the instruction (409) has been executed, the instruction can be removed (412) from the instruction queue (104) such that other instructions can be placed in the instruction queue (104) for subsequent execution. In the example method of FIG. 4, removing (412) the instruction (409) from the instruction queue (104) can be carried out by replacing the instruction (409) with another instruction, shifting all remaining instructions in the instruction queue (104) up in the instruction queue (104), and so on.

Figure 5:
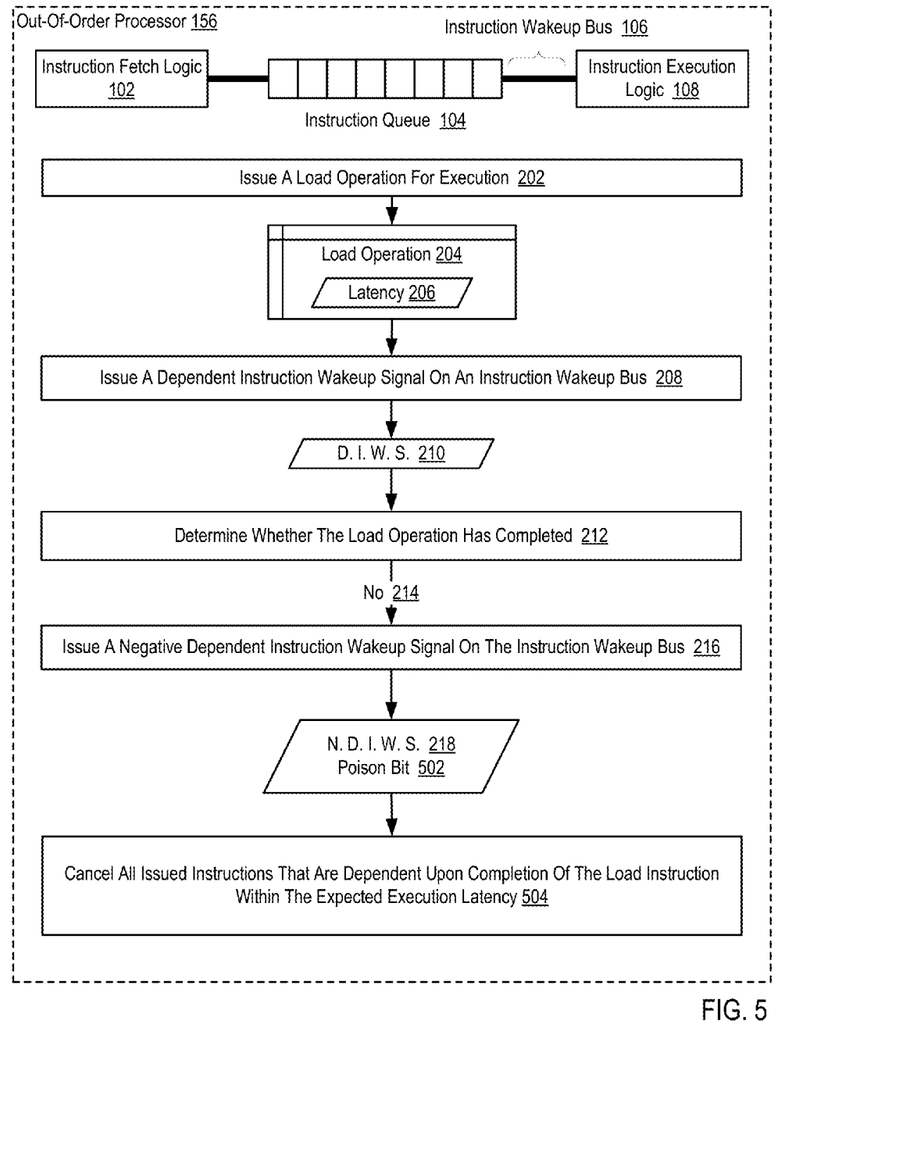
FIG. 5 sets forth a flow chart illustrating a further example method for load latency speculation in an out-of-order computer processor according to embodiments of the present invention.

For further explanation, FIG. 5 sets forth a flow chart illustrating a further example method for load latency speculation in an out-of-order computer processor (156) according to embodiments of the present invention. The example method of FIG. 5 is similar to the example method of FIG. 2 as it also includes issuing (202) a load instruction (204) for execution, issuing (208) a dependent instruction wakeup signal (210) on an instruction wakeup bus (106), determining (212) whether the load instruction (204) has completed, and issuing (216) a negative dependent instruction wakeup signal (218) on the instruction wakeup bus (106).

In the example method of FIG. 5, the negative dependent instruction wakeup signal (218) includes a poison bit (502) identifying a value that was not loaded into a targeted processor register upon the expiration of the expected execution latency (206). In the example method of FIG. 5, the poison bit (502) represents a status bit whose value indicates that the load instruction (204) did not execute within the expected execution latency (206) and that the value to be loaded into the processor register by the load instruction (204) is not available for use by dependent instructions.

The example method of FIG. 5 also includes cancelling (504) all issued instructions that are dependent upon completion of the load instruction within the expected execution latency. As described above, an instruction that is dependent upon the load instruction (204) may begin to enter the fetch, decode, and execution cycle prior to the completion of the load instruction (204) so long as the executed completion time of the load instruction (204) would allow for the value to be loaded into a processor register by the load instruction (204) to be utilized by the dependent instruction. If the load instruction (204) does not finish execution within the expected execution latency (206), however, all dependent instructions that were speculatively issued must be cancelled (504).

Example embodiments of the present invention are described largely in the context of a fully functional computer system for load latency speculation in an out-of-order computer processor. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of load latency speculation in an out-of-order computer processor, the method comprising:

issuing a load instruction for execution, wherein the load instruction has a predetermined expected execution latency;

issuing a dependent instruction wakeup signal on an instruction wakeup bus, wherein the dependent instruction wakeup signal indicates that the load instruction will be completed upon the expiration of the expected execution latency;

determining, upon the expiration of the expected execution latency, whether the load instruction has completed; and responsive to determining that the load instruction has not completed upon the expiration of the expected execution latency, issuing a negative dependent instruction wakeup signal on the instruction wakeup bus, wherein the negative dependent instruction wakeup signal indicates that the load instruction has not completed upon the expiration of the expected execution latency, and wherein the negative dependent instruction wakeup signal further indicates that data to be utilized by instructions dependent upon the load instruction will be unavailable at the expiration of the expected execution latency.

2. The method of claim 1 further comprising, responsive to the receipt of a dependent instruction wakeup signal, setting an input ready flag to a value indicating that an input value is available for all instructions in an instruction queue that are dependent upon the input value.

3. The method of claim 1 wherein further comprising, responsive to the receipt of a negative dependent instruction wakeup signal, setting an input ready flag to a value indicating that an input value is not available for all instructions in an instruction queue that are dependent upon the input value.

4. The method of claim 1 further comprising:

determining whether all input ready flags for an instruction in an instruction queue indicate that all input values for the instruction are available; and responsive to determining that all input ready flags for the instruction indicate that all input values for the instruction are available, issuing the instruction.

5. The method of claim 4 further comprising:

receiving an indication that the instruction has executed; and removing the instruction from the instruction queue.

6. The method of claim 1 further comprising cancelling all issued instructions that are dependent upon completion of the load instruction within the expected execution latency, wherein the negative dependent instruction wakeup signal includes a poison bit identifying a value that was not loaded into a processor register by the load instruction within the expected execution latency.

* * * * *